United States Patent
Fan et al.

(10) Patent No.: US 7,183,744 B2
(45) Date of Patent: Feb. 27, 2007

(54) BATTERY HOUSING STRUCTURE FOR PORTABLE DEVICES

(75) Inventors: Ping-Yang Fan, Chungli (TW); Yun-Ping Liu, Chungli (TW)

(73) Assignee: Uniwill Computer Corp., Chungli (TW)

( * ) Notice: Subject to any disclaimer, the term of this patent is extended or adjusted under 35 U.S.C. 154(b) by 0 days.

(21) Appl. No.: 11/158,131

(22) Filed: Jun. 21, 2005

(65) Prior Publication Data

US 2006/0226806 A1    Oct. 12, 2006

(30) Foreign Application Priority Data

Apr. 8, 2005    (TW) ............... 94205526 U (51) Int. Cl.
*H02J 7/00*    (2006.01)
(52) U.S. Cl. .................. 320/112; 320/114; 439/500
(58) Field of Classification Search ............... 320/107, 320/112, 114; 439/500; 429/96–100
See application file for complete search history.

(56) References Cited

U.S. PATENT DOCUMENTS

| | | | | |
|---|---|---|---|---|
| 5,058,045 A | * | 10/1991 | Ma | 361/683 |
| 5,621,301 A | * | 4/1997 | Allen et al. | 320/124 |
| 5,818,691 A | * | 10/1998 | McMahan et al. | 361/686 |
| 5,824,431 A | * | 10/1998 | Tsurumaru et al. | 429/97 |
| 6,077,107 A | * | 6/2000 | Hetherington | 439/500 |

* cited by examiner

*Primary Examiner*—Karl Easthom
*Assistant Examiner*—Samuel Berhanu
(74) *Attorney, Agent, or Firm*—Alan D. Kamrath; Nikolai & Mersereau, P.A.

(57) ABSTRACT

A battery housing structure for portable devices includes a battery chamber and a movable seat located in a portable device. The battery chamber has two housing compartments for holding batteries. The movable seat is slidable in the battery chamber and confined between a first position and a second position. The movable seat has a first connector and a second connector to be coupled with the batteries to form an electric connection to transmit battery electricity to the portable device.

20 Claims, 8 Drawing Sheets

BATTERY HOUSING STRUCTURE FOR PORTABLE DEVICES

FIELD OF THE INVENTION

The present invention relates to a battery housing structure for portable devices for providing continuous battery power supply during changing of the battery.

BACKGROUND OF THE INVENTION

Field of the Invention

Conventional portable devices, such as notebook computers, usually have a battery housing structure to hold a battery for providing a power supply required in the portable devices in an environment where no external power supply is available. However, when the battery is exhausted, even if there is a second backup battery, the portable device still has to be stopped first so as to remove the depleted battery and load the backup battery. Some portable devices have two battery chambers for holding two batteries. However, the two battery chambers are independent. To change the battery, the backup battery has to be unloaded before removing the depleted battery. It is not convenient to use. There is still a need for improving the battery housing structure of the portable devices.

SUMMARY OF THE INVENTION

The primary object of the invention is to provide a battery housing structure for portable devices that can continuously provide a battery electric power supply during changing of the battery. Another object of the invention is to provide a battery housing structure for portable devices that can easily unload the depleted battery during change of the battery.

Yet another object of the invention is to provide a battery housing structure for portable devices that can hold two batteries at the same time for charging or supplying electric power simultaneously.

To achieve the aforesaid objects, the battery housing structure for portable devices according to the invention includes a battery chamber and a movable seat in a portable device. The battery chamber has two housing compartments for holding two batteries. The movable seat is slidable in the battery chamber and confined between a first position and a second position. The movable seat has a first connector and a second connector to be coupled with the batteries for establishing an electric connection, so that the batteries can provide electricity to the portable device.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
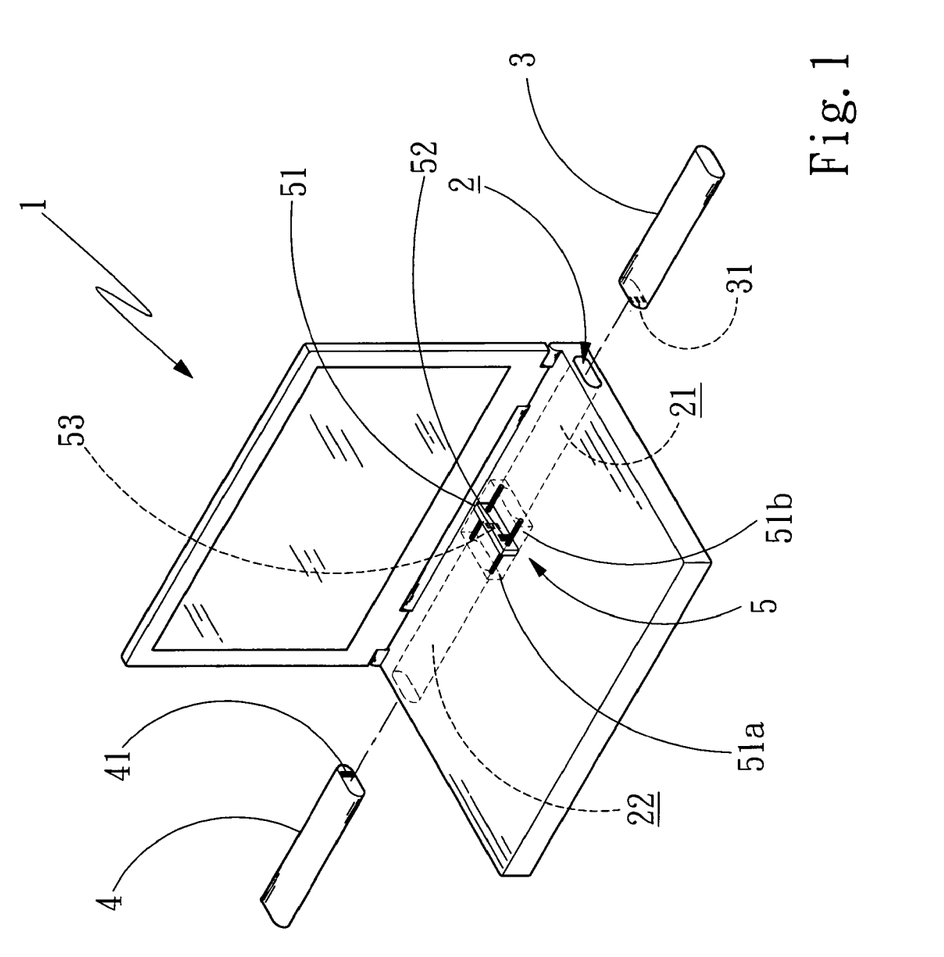
FIG. 1 is a perspective view of an embodiment of the battery housing structure according to the present invention.

Referring to FIG. 1, the battery housing structure according to the present invention mainly includes a portable device 1 which has a battery chamber 2 formed therein for holding a first battery 3 and a second battery 4. The batteries 3 and 4 can jointly or individually provide electricity required for operation of the portable device 1. The batteries 3 and 4 can jointly or individually be charged through an external power supply. There is a switch device 5 located in the battery chamber 2 for providing electric connection to the batteries 3 and 4 and battery replacement. In the following description, a notebook computer is used as the portable device to facilitate discussion.

In the battery housing structure of the present invention, the battery chamber 2 is hollow and runs axially through the portable device 1 to form openings on two ends. The hollow portion includes a first housing compartment 21 and a second housing compartment 22 for respectively holding the first battery 3 and the second battery 4. The switch device 5 has a movable seat 51 slidable between the first housing compartment 21 and the second housing compartment 22. The moveable seat 51 is confined between a first position 51a and a second position 51b. The movable seat 51 has a first connector 52 and a second connector 53 respectively corresponding to the openings of the first housing compartment 21 and the second housing compartment 22 so that the first connector 52 and the second connector 53 are able to be coupled with the first battery 3 and the second battery 4 for forming an electric connection to transmit electric power to the portable device 1.

The first battery 3 and the second battery 4, respectively, have an electric input/output section 31 and 41 on one end to couple with the first connector 52 and the second connector 53 of the movable seat 51 to form the electric connection and a structural coupling.

Figure 2:
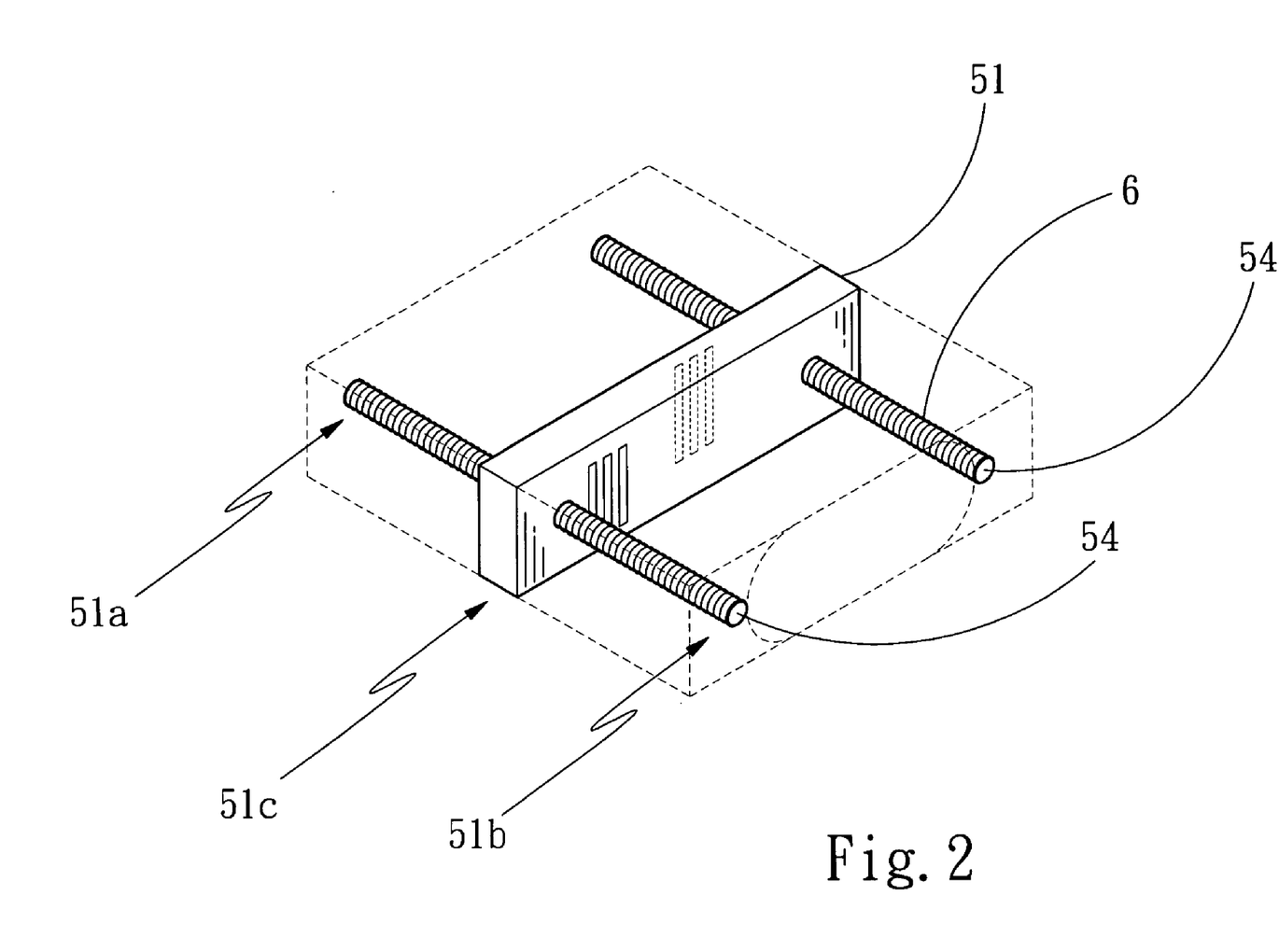
FIG. 2 is a fragmentary perspective view of another embodiment of the battery housing structure according to the present invention.

Referring to FIG. 2, another embodiment of the battery housing structure of according to the present invention includes the movable seat 51 mounted onto two guiding tracks 54 that are located in the first housing compartment 21 and the second housing compartment 22 in parallel with the extending direction of the battery chamber 2. Each of the tracks 54 is coupled with a spring 6 so that the movable seat 51 is confined on a balanced third position 51c between the first position 51a and the second position 51b.

The movable seat 51 is slidable linearly on the guiding tracks 54. The guiding tracks 54 may have a flute for confining the movement of the movable seat 51. The sliding movement of the movable seat 51 is confined between the first position 51a and the second position 51b.

Figure 3A:
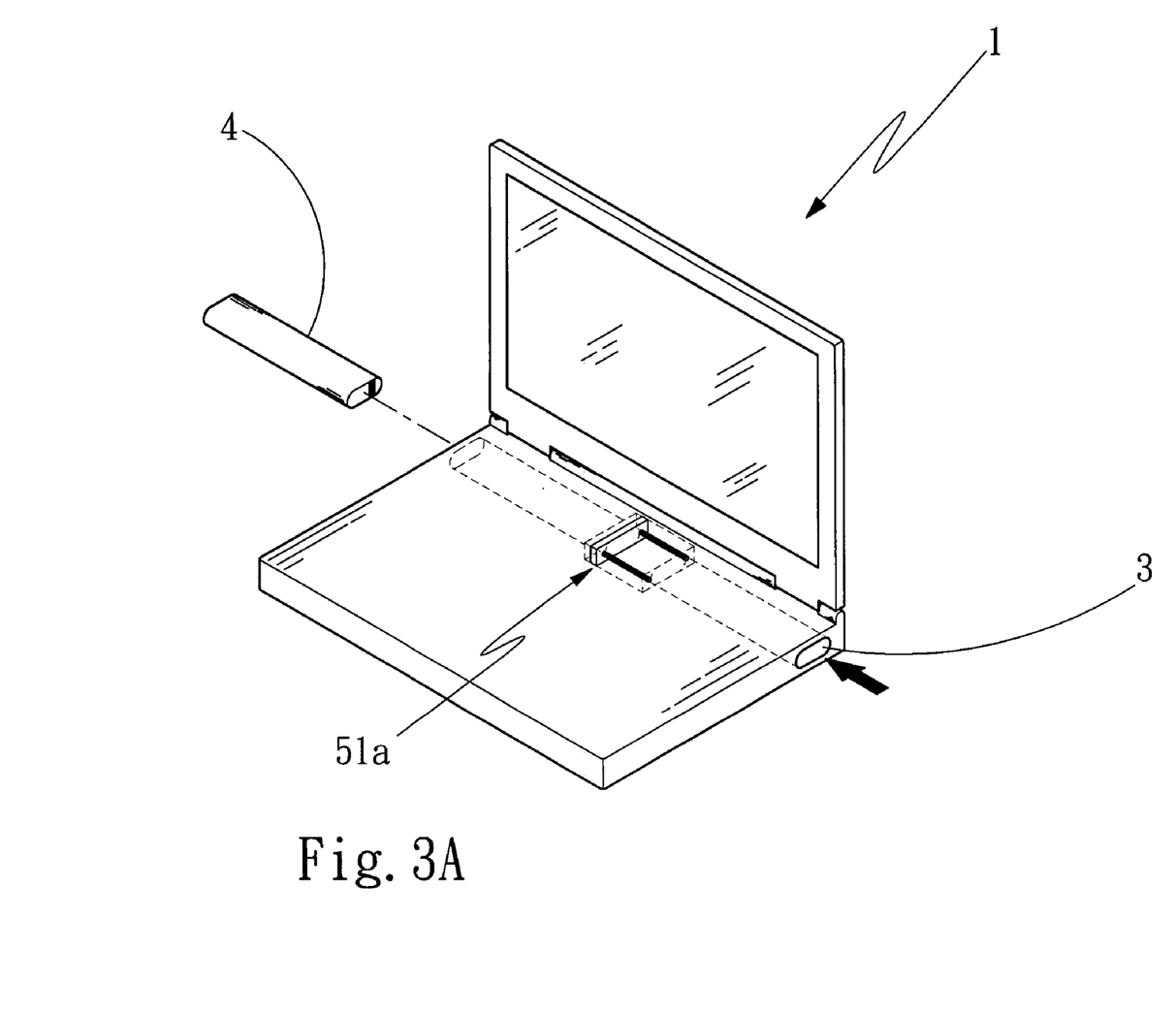
FIG. 3A is a perspective view of an embodiment according to the present invention with a first condition.
Figure 3B:
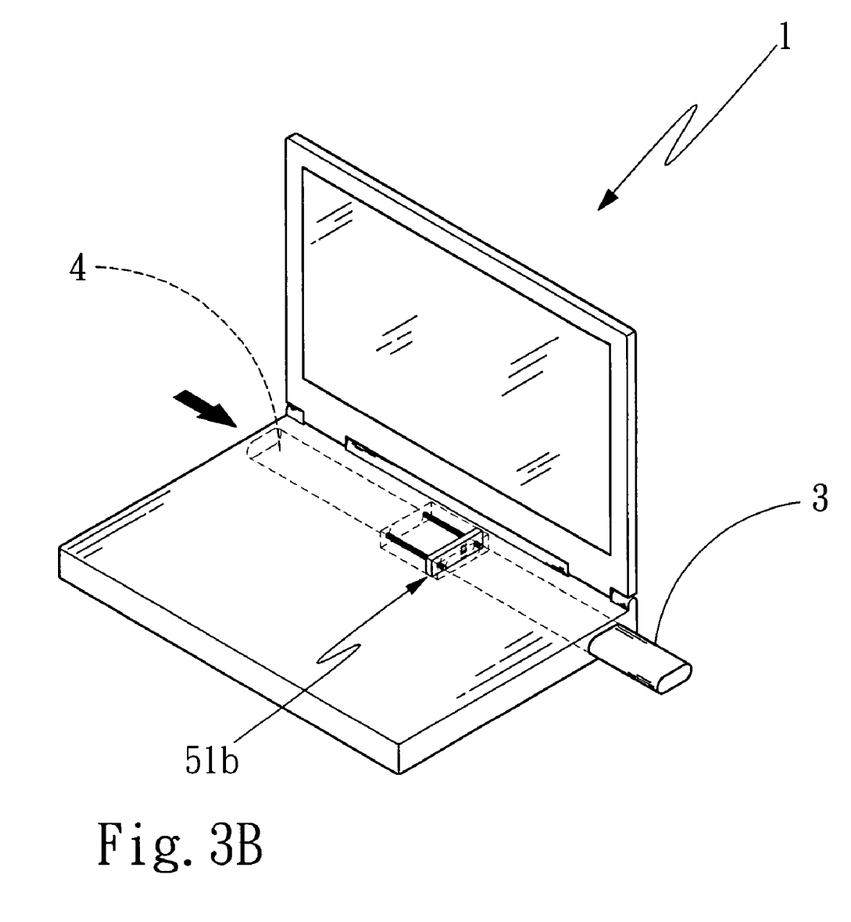
FIG. 3B is a perspective view of an embodiment of the invention with a second condition.
Figure 3C:
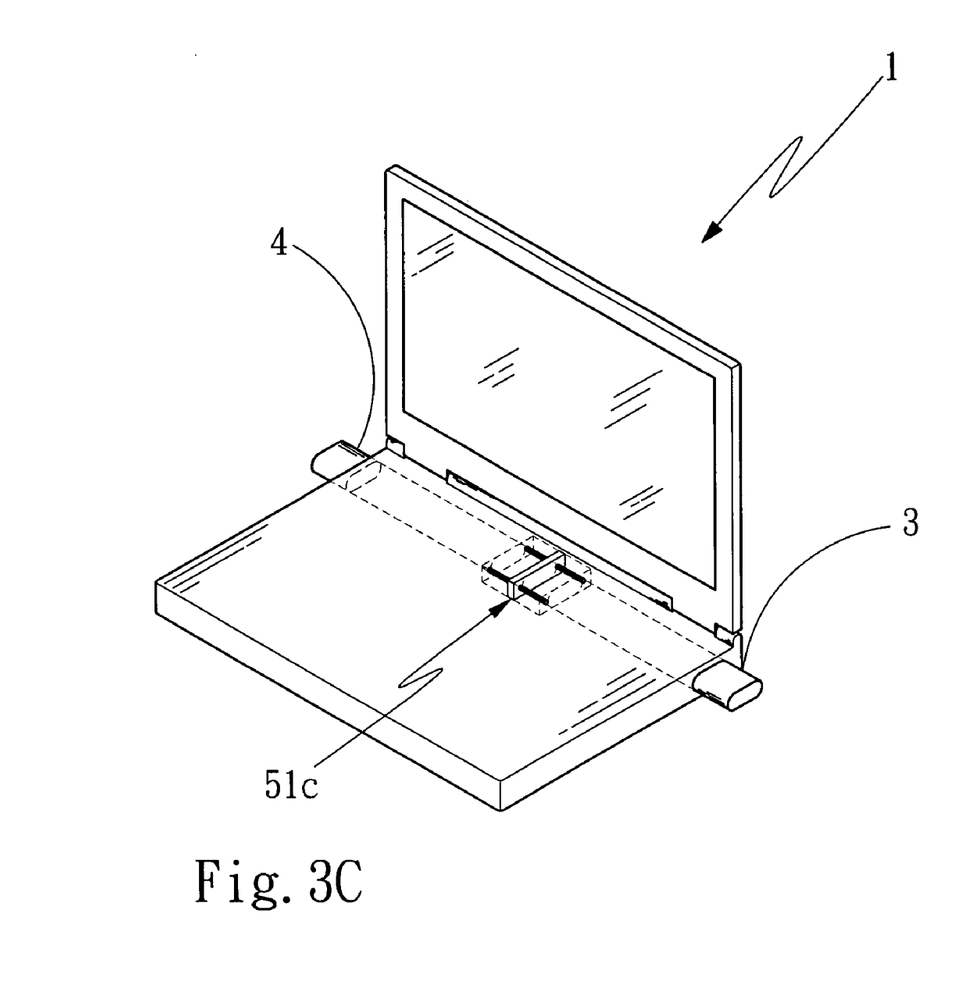
FIG. 3C is a perspective view of an embodiment of the invention with a third condition.

Refer to FIG. 3A for an embodiment of the invention in a first condition, FIG. 3B in a second condition, and FIG. 3C in a third condition.

Referring back to FIG. 1, when the movable seat 51 of the switch device 5 is on the third position 51c and the first battery 3 is loaded into the first housing compartment 21 of the battery chamber 2, the first battery 3 pushes the movable seat 51 to the first position 51a so that the electric input/output section 31 of the first battery 3 is coupled with the first connector 52 due to a counter reaction force of the movable seat 51 to form an electric connection. When the first battery 3 is unloaded, the movable seat 51 is moved to the third position 51c due to force balancing of the spring 6.

While the first battery 3 is held in the first housing compartment 21 of the battery chamber 2, the second battery 4 may be loaded into the second housing compartment 22 of the battery chamber 2 The second battery 4 pushes the movable seat 51 to the second position 51b, and the electric input/output section 41 on one end of the second battery 4 is coupled with the second connector 53 of the movable seat 51 to form an electric connection. Similarly, when the second battery 4 is unloaded, the movable seat 51 is moved to the third position 51c by the balancing force of the spring 6.

Figure 4:
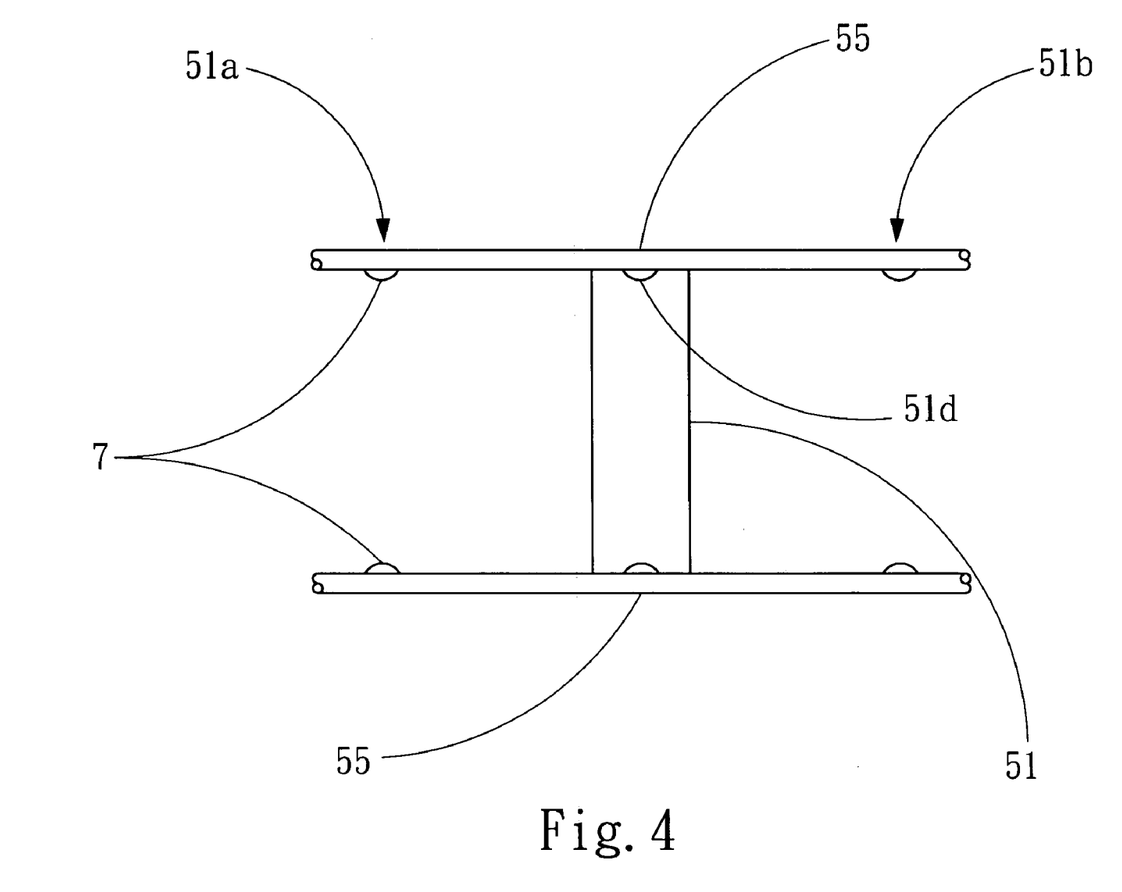
FIG. 4 is a fragmentary top view of yet another embodiment according to the present invention.

Refer to FIG. 4, another embodiment according to the present invention includes the. The movable seat 51 slidably mounted onto two guiding tracks 55 that are located in the first housing compartment 21 and the second housing compartment 22 of the battery chamber 2 in parallel with the extending direction of the battery chamber 2. There are a plurality of elastic elements 7 located on the battery chamber 2, respectively, corresponding to the first position 51a and position 51b to confine the movable seat 51. The movable seat 51 has cavities 51d on lateral sides corresponding to the elastic elements 7. The elastic elements 7 are formed in a bulged manner and engageable with cavities 51d. As subject to a selected force, the cavities 51d may be separated from the elastic elements 7.

Figure 5A:
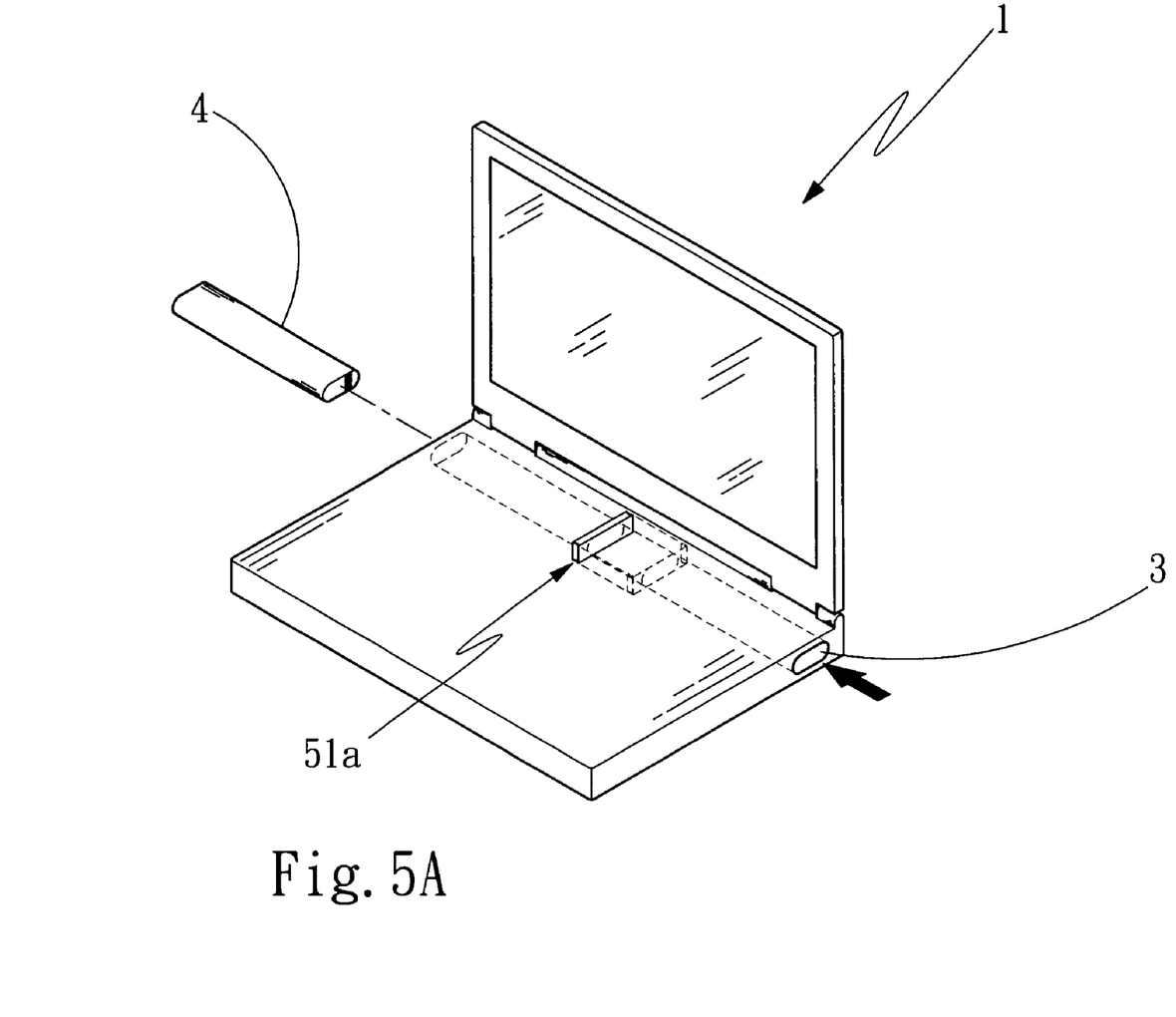
FIG. 5A is a perspective view of yet another embodiment of the invention with a first condition.
Figure 5B:
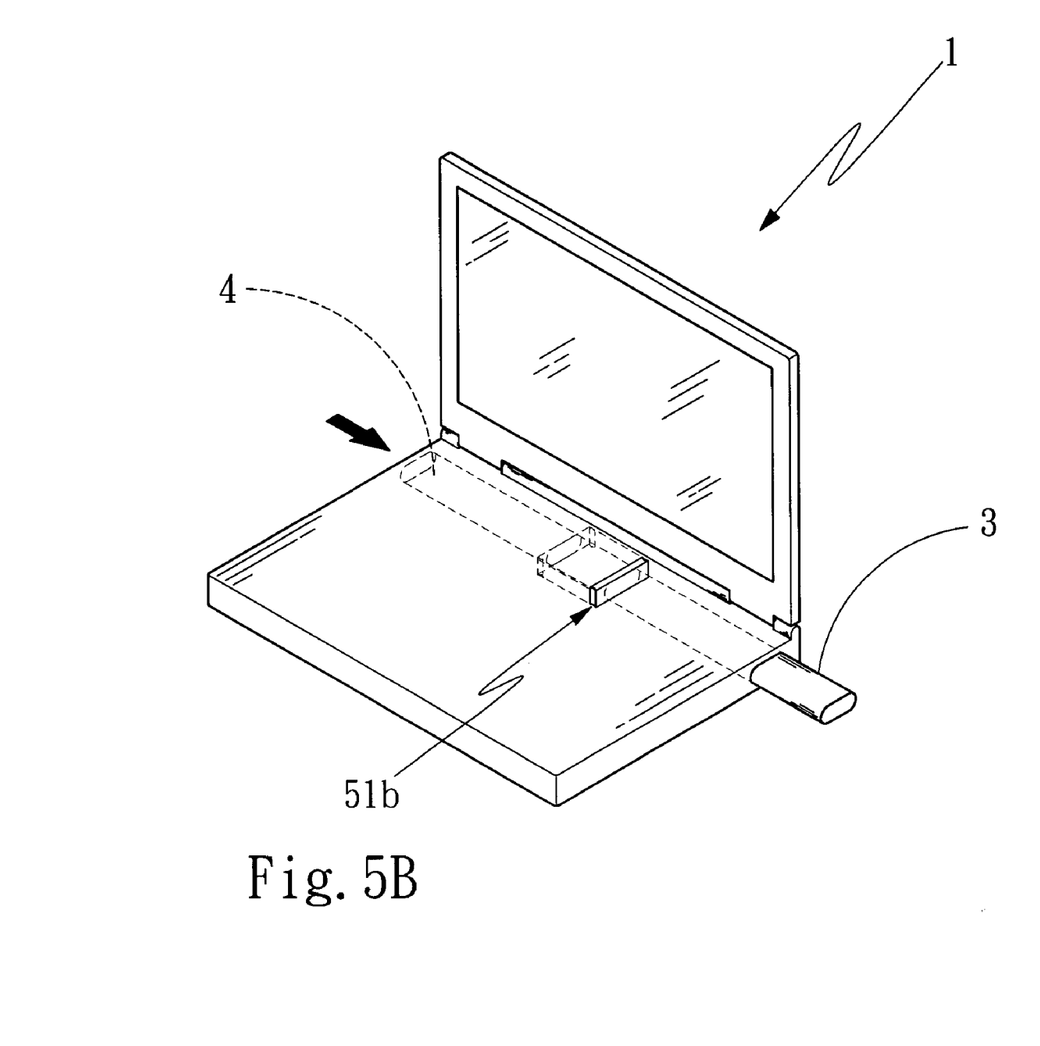
FIG. 5B is a perspective view of yet another embodiment of the invention with a second condition.

Refer to FIG. 5A for another embodiment of the invention in a first condition and FIG. 5B in a second condition.

Also shown in FIG. 5A, when the first battery 3 is loaded into the first housing compartment 21 of the battery chamber 2, the first battery 3 pushes the movable seat 51 to the first position 51a. Thus, the cavity 51d is engaged with the elastic element 7, and the electric input/output section 31 on one end of the first battery 3 is coupled with the first connector 52 of the movable seat 51 for forming an electric connection between the first battery 3 and the portable device 1. The movable seat 51 is anchored on the first position 51a.

Referring to FIG. 5B, when two batteries 3 and 4 are inserted into the portable device 1, the second battery 4 is loaded into the second housing compartment 22 of the battery chamber 2. The second battery 4 pushes the movable seat 51 to the second position 51b. The cavity 51d is going to be released from the elastic element 7 in the first position 51a, and then engaged with another elastic element 7 in the second position 51b, so that the second battery 4 and the second connector 53 are coupled to form an electric connection, and the movable seat 51 is anchored on the second position 51b. The first battery 3 is partly extended outside the first housing compartment 21 to facilitate removing. Hence, when changing the battery 3 and 4 of the portable device 1 for replacement, the power supply is continuously maintained without disruption. Changing the battery 3 and 4 for the portable device 1 can be accomplished easily.

Although the embodiments previously discussed mainly focus on changing of two batteries, in practice, the invention can house two batteries 3 and 4 at the same time for operation. In such a condition, the batteries 3 and 4 may also be charged by an external power supply.

While the preferred embodiments of the present invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A battery housing structure, for holding batteries in a portable electronic device, comprising:
   a hollow battery chamber running through the portable electronic device and having two openings on two ends to form two housing compartments for holding the batteries;
   a movable seat movable in the hollow battery chamber between the two housing compartments and confined between a first position and a second position; and
   two connectors respectively corresponding to the housing compartments so as to form an electric connection with the batteries for transmitting electricity between the batteries and the portable electronic device, with the connectors mounted to, carried by and movable with the movable seat for movement with the movable seat in the hollow battery chamber.

2. A battery housing structure for holding batteries in a portable electronic device, comprising:
   a hollow battery chamber running through the portable electronic device and having two openings on two ends to form two housing compartments for holding the batteries; and
   a movable seat, which is slidable set between the two housing compartments and confined between a first position and a second position, having two connectors respectively corresponding to the housing compartments so as to form an electric connection with the batteries for transmitting electricity between the batteries and the portable electronic device, wherein the movable seat is mounted onto guiding tracks; and guiding tracks are located between the housing compartments in parallel with an extending direction of the battery chamber so as to confine the movable seat for sliding linearly.

3. The battery housing structure of claim 2, wherein the battery chamber includes a plurality of springs to confine the movable seat for sliding between the first position and the second position.

4. The battery housing structure of claim 3, wherein the plurality of springs is located on the guiding tracks.

5. The battery housing structure of claim 2, wherein each of the guiding tracks has a flute used to confine the movable seat for sliding between the first position and the second position.

6. The battery housing structure of claim 1, wherein the batteries respectively have an electric input/output section on one end to couple with each connector of the movable seat for forming an electric connection and a structural coupling.

7. The battery housing structure of claim 1, wherein one of the movable seat and the battery chamber includes a plurality of cavities at spaced locations between the first and second positions and another of the movable seat and the batter chamber includes elastic elements corresponding to the cavities, with the elastic elements being bulged to engage with the cavities so as to confine the movable seat for sliding between the first position and the second position.

8. The battery housing structure of claim 7, wherein the movable seat is slidably mounted onto guiding tracks which confine the movable seat to slide linearly and are located between the housing compartments in parallel with an extending direction of the battery chamber.

9. The battery housing structure of claim 8, wherein the batteries respectively have an electric input/output section on one end to couple with a first connector and a second connector of the movable seat so as to form an electric connection and a structural coupling.

10. The battery housing structure of claim 4, wherein the plurality of springs are a plurality of coil springs, with the guiding tracks being within the coil springs.

11. The battery housing structure of claim 2, wherein the movable seat comprises through holes spaced from the periphery and in parallel with the extending direction of the battery chamber, with the extending direction extending between the first and second positions.

12. The battery housing structure of claim 1, wherein the battery chamber includes a plurality of springs to confine the movable seat for sliding between the first position and the second position.

13. The battery housing structure of claim 12, wherein the plurality of springs are a plurality of coil springs.

14. The battery housing structure of claim 2, wherein the batteries respectively have an electric input/output section on one end to couple with each connector of the movable seat for forming an electric connection and a structural coupling.

15. The battery housing structure of claim 2, wherein one of the movable seat and the battery chamber includes a plurality of cavities at spaced locations between the first and second positions and another of the movable seat and the batter chamber includes elastic elements corresponding to the cavities, with the elastic elements being bulged to engage with the cavities so as to confine the movable seat for sliding between the first position and the second position.

16. The battery housing structure of claim 15, wherein the movable seat is slidably mounted onto the guiding tracks which confine the movable seat to slide linearly and are located between the housing compartments in parallel with an extending direction of the battery chamber.

17. The battery housing structure of claim 16, wherein the batteries respectively have an electric input/output section on one end to couple with a first connector and a second connector of the movable seat so as to form an electric connection and a structural coupling.

18. The battery housing structure of claim 1, wherein the movable seat comprising through holes spaced from the periphery and in parallel with the extending direction of the battery chamber, with the extending direction extending between the first and second positions.

19. The battery housing structure of claim 4, wherein one of the movable seat and the battery chamber includes a plurality of cavities at spaced locations between the first and second positions and another of the movable seat and the batter chamber includes elastic elements corresponding to the cavities, with the elastic elements being bulged to engage with the cavities so as to confine the movable seat for sliding between the first position and the second position.

20. The battery housing structure of claim 5, wherein one of the movable seat and the battery chamber includes a plurality of cavities at spaced locations between the first and second positions and another of the movable seat and the batter chamber includes elastic elements corresponding to the cavities, with the elastic elements being bulged to engage with the cavities so as to confine the movable seat for sliding between the first position and the second position.

* * * * *